US009815461B2

(12) United States Patent
Miura et al.

(10) Patent No.: US 9,815,461 B2
(45) Date of Patent: *Nov. 14, 2017

(54) VEHICLE COLLISION AVOIDANCE SUPPORTING APPARATUS AND VEHICLE COLLISION AVOIDANCE SUPPORTING METHOD

(71) Applicant: HONDA MOTOR CO., LTD., Tokyo (JP)

(72) Inventors: Hiroshi Miura, Wako (JP); Takeshi Chiba, Wako (JP); Masashi Manita, Wako (JP); Yuki Sakai, Wako (JP); Minoru Kobayashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/980,120

(22) Filed: Dec. 28, 2015

(65) Prior Publication Data

US 2016/0185348 A1 Jun. 30, 2016

(30) Foreign Application Priority Data

Dec. 26, 2014 (JP) .................................. 2014-264493

(51) Int. Cl.
*G06F 17/10* (2006.01)
*G06G 7/78* (2006.01)
(Continued)

(52) U.S. Cl.
CPC ........ *B60W 30/0953* (2013.01); *B60W 30/08* (2013.01); *B60W 30/09* (2013.01);
(Continued)

(58) Field of Classification Search
CPC ..... B60W 2710/083; B60W 2550/306; B60W 2710/182; B60W 2750/308;
(Continued)

(56) References Cited

U.S. PATENT DOCUMENTS 5,939,976 A * 8/1999 Sasaki .................... B60Q 9/008
340/435
6,008,741 A * 12/1999 Shinagawa ............. G08G 1/164
340/436
(Continued)

FOREIGN PATENT DOCUMENTS

JP 2006-227690 A 8/2006
JP 2010-102641 A 5/2010
(Continued)

OTHER PUBLICATIONS

Office Action dated Sep. 6, 2016, issued in counterpart Japanese Patent Application No. 2014-264493. (4 pages).

*Primary Examiner* — Jelani Smith
*Assistant Examiner* — Luis A Martinez Borrero
(74) *Attorney, Agent, or Firm* — Westerman, Hattori, Daniels & Adrian, LLP

(57) ABSTRACT

After determination of from which side, right or left, a second vehicle is approaching, a position of a collision point is determined, a position of a stop point is set from the determined collision point, and a warning is given at a position and timing of a warning point which is set to allow a first vehicle to stop before the set stop point.

9 Claims, 13 Drawing Sheets

(51) Int. Cl.
  *G08G 1/16* (2006.01)
  *B60W 30/095* (2012.01)
  *B60W 50/14* (2012.01)
  *B60W 30/08* (2012.01)
  *B60W 30/09* (2012.01)

(52) U.S. Cl.
  CPC ....... *B60W 50/14* (2013.01); *B60W 2050/143* (2013.01); *B60W 2510/06* (2013.01); *B60W 2520/00* (2013.01); *B60W 2550/10* (2013.01); *B60W 2550/304* (2013.01); *B60W 2550/308* (2013.01); *B60W 2900/00* (2013.01)

(58) Field of Classification Search
  CPC ........... B60W 30/085; B60W 30/0953; B60W 2550/302; B60W 2050/0073; B60W 2550/404; B60W 2550/408; B60W 2710/22; B60W 30/0956; G01C 21/3461; G01C 21/3667; G01C 21/3407; G01C 40/107
  USPC ................ 701/117, 23, 41, 70; 180/68.5
  See application file for complete search history.

(56) References Cited

U.S. PATENT DOCUMENTS

| | | | | |
|---|---|---|---|---|
| 6,307,484 | B1* | 10/2001 | Sasaki | G08G 1/164 340/436 |
| 8,000,897 | B2* | 8/2011 | Breed | B60N 2/2863 701/301 |
| 8,340,894 | B2* | 12/2012 | Yester | G08G 1/163 340/436 |
| 8,618,952 | B2* | 12/2013 | Mochizuki | G08G 1/096783 340/435 |
| 8,818,641 | B2* | 8/2014 | Yester | B60K 35/00 701/45 |
| 2001/0012982 | A1* | 8/2001 | Ogura | G08G 1/166 701/301 |
| 2011/0087433 | A1* | 4/2011 | Yester | G08G 1/163 701/301 |
| 2012/0016581 | A1* | 1/2012 | Mochizuki | G08G 1/161 701/301 |
| 2012/0150405 | A1* | 6/2012 | Fukawa | G01S 3/28 701/70 |
| 2012/0235853 | A1* | 9/2012 | Takeuchi | B60W 30/09 342/71 |
| 2015/0353081 | A1* | 12/2015 | Kaminade | G01S 13/931 701/1 |
| 2016/0155334 | A1* | 6/2016 | Jansson | G08G 1/164 340/906 |
| 2016/0280134 | A1* | 9/2016 | Miura | B60Q 9/008 |

FOREIGN PATENT DOCUMENTS

| | | |
|---|---|---|
| JP | 2013-507691 A | 3/2013 |
| JP | 2013-068016 A | 4/2013 |

* cited by examiner

VEHICLE COLLISION AVOIDANCE SUPPORTING APPARATUS AND VEHICLE COLLISION AVOIDANCE SUPPORTING METHOD

CROSS REFERENCES TO RELATED APPLICATIONS

The present application claims priority under 35 U.S.C. §119 to Japanese Patent Application No. 2014-264493, filed Dec. 26, 2014, entitled "Vehicle Collision Avoidance Supporting Apparatus and Vehicle Collision Avoidance Supporting Method." The contents of this application are incorporated herein by reference in their entirety.

BACKGROUND

1. Field

The present disclosure relates to a vehicle collision avoidance supporting apparatus and a vehicle collision avoidance supporting method that support avoidance of a collision of a subject vehicle about to enter an intersection with another vehicle (which may also be referred to as a crossing vehicle) traveling in a direction crossing the travel direction of the subject vehicle and about to enter the intersection.

2. Description of the Related Art

Japanese Unexamined Patent Application Publication No. 2010-102641 discloses a collision avoidance supporting apparatus that supports avoidance of a collision between a subject vehicle and another vehicle at an intersection.

In the technique disclosed in Japanese Unexamined Patent Application Publication No. 2010-102641, the collision avoidance supporting apparatus gives a warning about a crossing vehicle (another vehicle) entering the intersection after stopping before the intersection, as viewed from the subject vehicle, earlier than a warning about an oncoming vehicle approaching from the front (see paragraph [0021] in Japanese Unexamined Patent Application Publication No. 2010-102641).

For example, the United States adopts a right-hand traffic system where, in principle, vehicles travel on the right side of the road. In this case, in the depth direction (heading direction) as viewed from a subject vehicle, the distance to another vehicle coming from the sight toward an intersection (i.e., inside of an area where two different roads cross each other) is longer than the distance to another vehicle coming from the left toward the intersection. Therefore, if a warning about the vehicle coming from the left and a warning about the vehicle coming from right are given at the same warning timing, the resulting delay in the timing of the warning about the vehicle coming from the right may cause the subject vehicle to stop within the intersection.

However, the technique disclosed in Japanese Unexamined Patent Application Publication No. 2010-102641 does not take into account from which side (right or left) another vehicle is approaching the intersection, and still has room for improvement.

SUMMARY

The present disclosure has been made in view of the problems described above. It is desirable to provide a vehicle collision avoidance supporting apparatus and a vehicle collision avoidance supporting method capable of warning a driver of a first vehicle (subject vehicle) at appropriate timing which prevents a collision with a second vehicle (crossing vehicle) traveling in a direction crossing a travel direction of the first vehicle at an intersection of roads, while allowing the first vehicle to stop at an appropriate position before the intersection. The second vehicle may approach the intersection from either the right side (i.e., the approaching direction of the second vehicle is the right-to-left direction) or left side (i.e., the approaching direction of the second vehicle is the left-to-right direction) in a view from the first vehicle. Since the intersection has certain crossing width (typically two or more lanes), the second vehicle may enter the intersection from different positions or lanes, and thus, the possible collision points may be different depending on the approaching direction of the second vehicle. According to the present invention, the warning to the driver of the first vehicle can be given at the appropriate timing which prevents a collision at the intersection and does not allow the first vehicle to stop within the intersection, regardless of the different possible collision points within the intersection.

A vehicle collision avoidance supporting apparatus according to an aspect of the present disclosure includes a first-vehicle-information acquiring unit configured to acquire a driving state of a first vehicle which is a subject vehicle; a second-vehicle-information acquiring unit configured to acquire a driving state of a second vehicle moving in a direction crossing a travel direction of the first vehicle; a collision possibility determining unit configured to determine, from the driving states of the first vehicle and the second vehicle, a possibility of collision between the first vehicle and the second vehicle at a collision point within an intersection; a warning unit configured to give a warning to a driver if the collision between the first vehicle and the second vehicle is determined to be possible; an approach direction determining unit configured to determine from which of right and left sides, as viewed in the travel direction of the first vehicle, the second vehicle is approaching the first vehicle; a collision point determining unit configured to determine the collision point depending on the determined side, right or left, from which the second vehicle is approaching; and a stop point setting unit configured to set, on the basis of the determined collision point, a stop point serving as a stop target for the first vehicle. The warning unit gives the warning to the driver upon entry of the first vehicle into a predetermined range determined on the basis of the stop point.

In this aspect of the present disclosure, after the determination of from which side (right or left) the second vehicle is approaching, the position of the collision point is determined, the position of the stop point serving as a stop target for the first vehicle is set, and the warning is given upon entry of the first vehicle into the predetermined range determined on the basis of the stop point. Therefore, even when the second vehicle (crossing vehicle) traveling in a direction crossing the travel direction of the first vehicle about to enter the intersection is approaching from either the right or left side, the warning can be given at appropriate timing which can prevent a collision at the intersection and can eliminate the possibility that the first vehicle may stop within the intersection.

The vehicle collision avoidance supporting apparatus described above may further include a warning point setting unit configured to set a warning point, at a position within the predetermined range before the stop point as viewed from the first vehicle, to allow the first vehicle to stop before the stop point. If the collision possibility determining unit determines that the collision between the first vehicle and the second vehicle is possible, the warning unit may give the warning upon passage of the first vehicle beyond the warning point.

In this case, after the determination of from which side (right or left) the second vehicle is approaching, the position of the collision point is determined, the position of the stop point is set on the basis of the determined position of the collision point, and the warning is given upon passage of the first vehicle beyond the warning point which is set to allow the first vehicle to stop before the set stop point. Therefore, even when the second vehicle is approaching from either the right or left side, it is possible to alert the driver at a more appropriate position and timing which does not allow the first vehicle to enter the intersection, and thus to provide support for the first vehicle to reliably stop before the stop point.

In the vehicle collision avoidance supporting apparatus described above, the stop point setting unit preferably sets in advance the stop point at a predetermined distance from the collision point toward the first vehicle, and adjusts the position of the set stop point on the basis of from which of right and left sides, as viewed in the travel direction of the first vehicle, the second vehicle is approaching the first vehicle.

As described above, the position of the stop point set in advance with respect to the collision point may be used as a reference position (temporary stop point), which may be adjusted on the basis of from which the side (right or left) the second vehicle is approaching. Thus, the position of the stop point can be appropriately set with a simple configuration.

In the vehicle collision avoidance supporting apparatus described above, the stop point setting unit may adjust the position of the stop point using a distance based on the number of lanes within the intersection. By adjusting the position of the stop point in accordance with the number of lanes, the stop point can be set at an appropriate position and, as a result, the warning can be given at appropriate timing which does not allow the first vehicle to enter the intersection. This can provide support for the first vehicle to reliably stop before the stop point.

In the vehicle collision avoidance supporting apparatus described above, the second-vehicle-information acquiring unit may be a vehicle-to-vehicle communication device that acquires the driving state of the second vehicle. Thus, the driving state of the second vehicle can be easily acquired through vehicle-to-vehicle communication.

The vehicle collision avoidance supporting apparatus described above may further include a driving-lane-position identifying unit configured to identify a lane position at which the second vehicle is traveling, and the stop point setting unit of the vehicle collision avoidance supporting apparatus may determine the distance based on the number of lanes in accordance with the lane position identified by the driving-lane-position identifying unit. By identifying the lane position (driving lane position) at which the second vehicle is traveling, the stop point can be set at a correct and appropriate position, and the warning can be given at a more appropriate position. This can provide support for the first vehicle to reliably stop before the stop point.

In the vehicle collision avoidance supporting apparatus described above, the driving-lane-position identifying unit may acquire an image picked up by an image pickup device included in the second vehicle, and may identify, from the acquired image, the lane position at which the second vehicle is traveling. By using the image picked up by the image pickup device of the second vehicle, the driving lane position of the second vehicle can be easily identified.

A vehicle collision avoidance supporting apparatus according to another aspect of the present disclosure includes a first-vehicle-information acquiring unit configured to acquire a driving state of a first vehicle which is a subject vehicle; a second-vehicle-information acquiring unit configured to acquire a driving state of a second vehicle moving in a direction crossing a travel direction of the first vehicle; a collision possibility determining unit configured to determine, from the driving states of the first vehicle and the second vehicle, a possibility of collision between the first vehicle and the second vehicle at a collision point within an intersection; a warning unit configured to give a warning to a driver if the collision between the first vehicle and the second vehicle is determined to be possible; a driving-lane-position identifying unit configured to identify a lane position at which the second vehicle is traveling; a stop point setting unit configured to set, depending on the lane position at which the second vehicle is traveling, a stop point serving as a stop target for the first vehicle; and a warning point setting unit configured to set a warning point, at a position before the stop point, to allow the first vehicle to stop before the stop point. If the collision possibility determining unit determines that the collision between the first vehicle and the second vehicle is possible, the warning unit gives the warning to the driver upon passage of the first vehicle beyond the warning point.

In this aspect of the present disclosure, after the determination of the lane in which the second vehicle is traveling, the position of the stop point is set and the warning is given at the position and timing of passage of the first vehicle beyond the warning point, which is set to allow the first vehicle to stop before the stop point. Accordingly, regardless of the lane in which the second vehicle is traveling, the warning can be given at the position and timing which does not allow the first vehicle to enter the intersection. This can provide support for the first vehicle to reliably stop before the stop point at the entrance to the intersection.

A vehicle collision avoidance supporting method according to another aspect of the present disclosure is a collision avoidance supporting method for a first vehicle which is a subject vehicle including a first-vehicle-information acquiring unit configured to acquire a driving state of the first vehicle and a second-vehicle-information acquiring unit configured to acquire a driving state of a second vehicle moving in a direction crossing a travel direction of the first vehicle. The vehicle collision avoidance supporting method includes a collision possibility determining step of determining, from the driving states of the first vehicle and the second vehicle, a possibility of collision between the first vehicle and the second vehicle at a collision point within an intersection; an approach direction determining step of determining from which of right and left sides, as viewed in the travel direction of the first vehicle, the second vehicle is approaching the first vehicle; a collision point determining step of determining the collision point depending on the determined side, right or left, from which the second vehicle is approaching; a stop point setting step of setting, on the basis of the determined collision point, a stop point serving as a stop target for the first vehicle; a warning point setting step of setting a warning point, at a position before the stop point as viewed from the first vehicle, to allow the first vehicle to stop before the stop point; and a warning step of giving a warning to a driver upon passage of the first vehicle beyond the warning point if the collision possibility determining step determines that the collision between the first vehicle and the second vehicle is possible.

In the vehicle collision avoidance supporting method described above, after the determination of from which side (right or left) the second vehicle is approaching, the position of the collision point is determined, the position of the stop point is set on the basis of the determined position of the collision point, and the warning is given at the position and timing of the warning point which is set to allow the first vehicle to stop before the set stop point. Accordingly, even when the second vehicle is approaching from either the right or left side, it is possible to alert the driver at an appropriate position and timing which prevents entry into the intersection, and thus to provide support for the first vehicle to reliably stop before the stop point.

In the aspects of the present disclosure described above, after the determination of from which side (right or left) the second vehicle is approaching, the position of the collision point is determined, the position of the stop point serving as a stop target for the first vehicle is set, and the warning is given upon entry of the first vehicle into the predetermined range determined on the basis of the stop point. Therefore, even when the second vehicle (crossing vehicle) traveling in a direction crossing the travel direction of the first vehicle about to enter the intersection is approaching the first vehicle from either the right or left side, the warning can be given at appropriate timing which can prevent a collision at the intersection and can prevent the first vehicle from stopping (or can eliminate the possibility that the first vehicle may stop) within the intersection.

DESCRIPTION OF THE PREFERRED EMBODIMENTS

Preferred embodiments of a vehicle collision avoidance supporting apparatus and a vehicle collision avoidance supporting method for implementing the vehicle collision avoidance supporting apparatus will now be described in detail with reference to the attached drawings.

Figure 1:
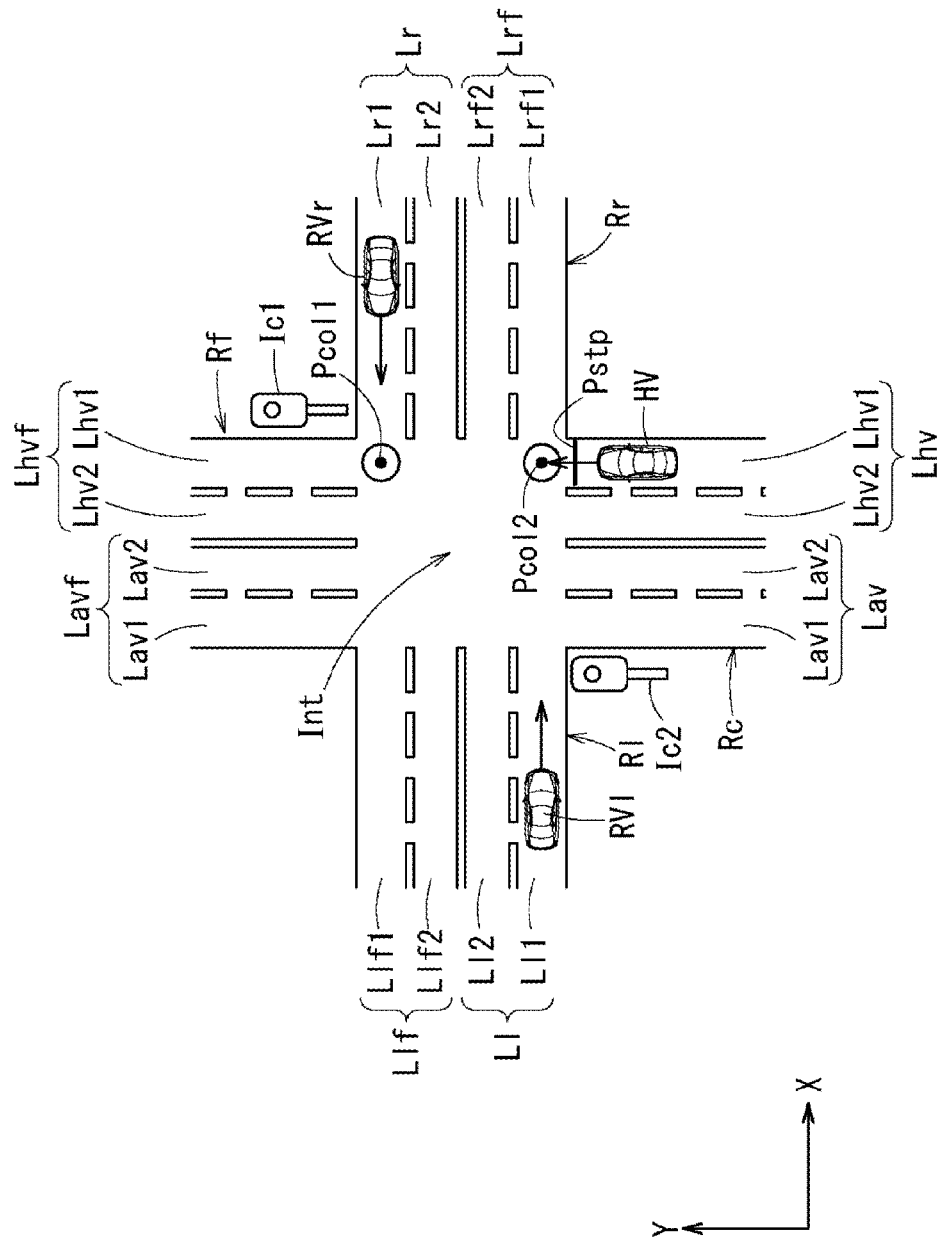
FIG. 1 is a schematic plan view illustrating a state before entry of a subject vehicle (first vehicle) and other vehicles (second vehicles), each having a vehicle collision avoidance supporting apparatus of an embodiment, into an intersection.

FIG. 1 is a schematic plan view illustrating a state before entry of a subject vehicle (first vehicle) HV and other vehicles (second vehicles) RVr and RVl into an intersection Int which is a crossroads. The first vehicle HV includes all components of a vehicle collision avoidance supporting apparatus 10 of the present embodiment, whereas the second vehicles RVr and RVl each include some of the components of the vehicle collision avoidance supporting apparatus 10 of the present embodiment. Although right-hand traffic is described as an example in the present embodiment, the present disclosure is also applicable to left-hand traffic (i.e., state of traffic as viewed from the backside of FIG. 1). In FIG. 1, an arrow extending from the front of the body of each of the first vehicle HV and the second vehicles RVr and RVl indicates the vehicle's travel direction.

A first-vehicle-side lane Lhv extending in a longitudinal direction (heading direction) in which the first vehicle HV travels includes two lanes, a first first-vehicle-side lane Lhv1 and a second first-vehicle-side lane Lhv2. The first-vehicle-side lane Lhv connects, via the intersection Int, to a first-vehicle-side lane Lhvf including two lanes, the first first-vehicle-side lane Lhv1 and the second first-vehicle-side lane Lhv2, of a front-side road Rf.

An oncoming-vehicle-side lane Lav extending in the longitudinal direction (heading direction) includes two lanes, a first oncoming-vehicle-side lane Lav1 and a second oncoming-vehicle-side lane Lav2, and also connects via the intersection Int to an oncoming-vehicle-side lane Lavf.

The second vehicle RVr approaching from a right-side road Rr and located on the back side in the depth direction, as viewed from the first vehicle HV, travels in a right-side approaching lane Lr extending in the crossing direction (transverse direction). The right-side approaching lane Lr includes two lanes, a first right-side approaching lane Lr1 and a second right-side approaching lane Lr2, and connects via the intersection Int to a left-side departing lane Llf including a first left-side departing lane Llf1 and a second left-side departing lane Llf2.

Similarly, the second vehicle RVl approaching from a left-side road Rl and located on the front side in the depth direction, as viewed from the first vehicle HV, travels in a left-side approaching lane Ll extending in the crossing direction (transverse direction). The left-side approaching lane Ll includes two lanes, a first left-side approaching lane Ll1 and second left-side approaching lane Ll2, and connects via the intersection Int to a right-side departing lane Lrf including a first right-side departing lane Lrf1 and a second right-side departing lane Lrf2.

A road-side camera Ic1 and a road-side camera Ic2, each serving as an infrastructure camera using a communication method called dedicated short range communication (DSRC) or spot communication, are installed on both sides of the intersection Int in a diagonal direction as viewed from the first vehicle HV. The road-side camera Ic1 is located on the road side near the intersection of the first right-side approaching lane Lr1 and the first first-vehicle-side lane Lhv1. The road-side camera Ic2 is located on the road side near the intersection of the first left-side approaching lane Ll1 and the first oncoming-vehicle-side lane Lav1. Other road-side cameras (not shown) are also installed on both sides in the other diagonal direction crossing the diagonal direction of the intersection Int described above.

In the present embodiment, the road-side camera Ic1 mainly and sequentially picks up images of the right-side road Rr, the second vehicle RVr approaching (entering) the intersection Int from the right-side road Rr, and the intersection Int, whereas the road-side camera Ic2 mainly and sequentially picks up images of the left-side road Rl, the second vehicle RVl approaching (entering) the intersection Int from the left-side road Rl, and the intersection Int.

As described below, a collision point Pcol1 and a collision point Pcol2 are set within the intersection Int. The collision point Pcol1 is a predicted (virtual) point of collision between the second vehicle RVr approaching the intersection Int from the right-side road Rr toward the left-side road Rl, and the first vehicle HV traveling from a first-vehicle-side road Rc toward the front-side road Rf. The collision point Pcol2 is a predicted (virtual) point of collision between the second vehicle RVl approaching the intersection Int from the left-side road Rl toward the right-side road Rr, and the first vehicle HV traveling from the first-vehicle-side road Rc toward the front-side road Rf.

A virtual stop point (which may also be referred to as a stop line or position) Pstp is set near an entrance where the first-vehicle-side road Rc for the first vehicle HV enters the intersection Int. The collision points Pcol1 and Pcol2 are referred to as "virtual" points, because they are not actually shown on the road.

Figure 2:
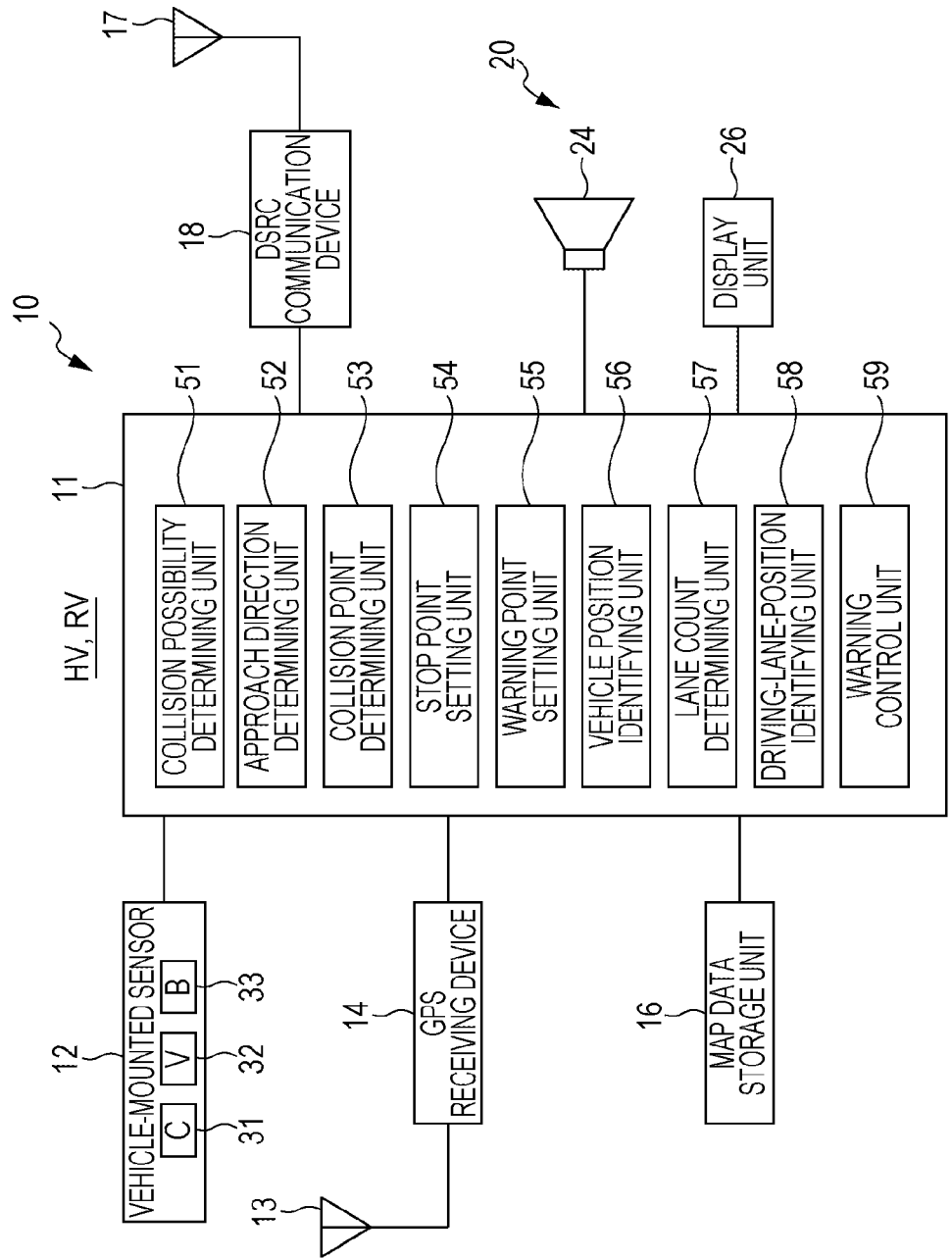
FIG. 2 is a block diagram illustrating a detailed configuration of the vehicle collision avoidance supporting apparatus of the embodiment.

FIG. 2 is a block diagram illustrating a detailed configuration of the vehicle collision avoidance supporting apparatus 10 mounted on the first vehicle HV. Both the second vehicles RVr and RVl (each referred to as "second vehicle RV") have basically the same components as the first vehicle HV, except for a vehicle position identifying unit 56 included in a controller 11.

As can be seen in FIG. 2, the vehicle collision avoidance supporting apparatus 10 includes the controller 11 which is a main body of the vehicle collision avoidance supporting apparatus 10, a vehicle-mounted sensor 12 connected to the controller 11, a global positioning system (GPS) receiving device 14, a map data storage unit 16, a DSRC communication device 18, and a warning unit 20. In the present embodiment, the second vehicle RV traveling on a crossing road (including the right-side road Rr and the left-side road Rl) where vehicles are given priority for passage through the intersection Int over those on the first-vehicle-side road Rc does not need to have the components of the controller 11 except for the vehicle position identifying unit 56.

The vehicle-mounted sensor 12 includes a front camera 31 configured to pick up an image of an area ahead of the vehicle, a vehicle velocity sensor 32 configured to detect a vehicle velocity V, and a brake sensor 33 configured to detect ON and OFF of a brake operation.

The GPS receiving device 14 detects a GPS signal from a GPS satellite via a GPS antenna 13, calculates the position (including the latitude, longitude, and altitude) of the first vehicle HV (second vehicle RV), and transmits the calculated position to the controller 11. From moment to moment, the first vehicle HV and the second vehicle RV each detect its own position by using the vehicle position identifying unit 56, and store the detected position.

In the present embodiment, for ease of understanding, the first vehicle HV and the second vehicle RV are assumed to have coordinates HV (Xhv [m], Yhv [m]) of the first vehicle HV and coordinates RV (Xrv [m], Yrv [m]) of the second vehicle RV, respectively, with respect to the origin (not shown) of a two-dimensional orthogonal coordinate system, which does not include altitude. The coordinates RV (Xrv, Yrv) of the second vehicle RV may be referred to as coordinates RVr (Xrvr, Yrvr) and coordinates RVl (Xrvl, Yrvl) for distinction between the coordinate positions of the second vehicle RVr approaching from the right-side road Rr and the second vehicle RVl approaching from the left-side road Rl. The first vehicle HV and the second vehicle RV travel parallel to the Y axis (longitudinal direction) and the X axis (transverse direction), respectively, shown in FIG. 1.

In practice, the vehicle position identifying unit 56 of each of the first vehicle HV and the second vehicle RV detects the current position of the corresponding vehicle on a real-time basis (i.e., the vehicle position identifying unit 56 of the first vehicle HV detects the current position of the first vehicle HV, and the vehicle position identifying unit 56 of the second vehicle RV detects the current position of the second vehicle RV). The current position includes the position of the vehicle obtained by the GPS receiving device 14 and the azimuth and direction of travel obtained by a vibrating gyroscope (not shown).

The map data storage unit 16 stores not only so-called road map data, but also intersection names, road names, and information about the number of lanes in each of the roads (right-side road Rr, left-side road Rl, first-vehicle-side road Rc, and front-side road Rf).

The DSRC communication device 18 acquires, through so-called vehicle-to-vehicle communication via an antenna 17, the vehicle velocity V of a target vehicle (which is the second vehicle RV for the first vehicle HV) about to enter the intersection Int, ON ("during braking" with a brake pedal held down) and OFF ("during driving" with the brake pedal released) of the brake sensor 33 of the target vehicle, an image picked up by the front camera 31 of the target vehicle, information about the position of the target vehicle, travel direction of the target vehicle, and information about a direction indicator of the target vehicle.

The controller 11 is a calculator including a microcomputer. The controller 11 includes a central processing unit (CPU); a memory (storage unit) including a read-only memory (ROM including an electrically erasable programmable read-only memory (EEPROM)), a random-access memory (RAM), and a hard disk drive (HDD); an input-output device, such as an A/D converter or a D/A converter; and a timer. The CPU reads and executes programs recorded in the ROM, whereby the controller 11 functions as various function realizing units, such as a control unit, a computing unit, and a processing unit.

As function realizing units, the controller 11 specifically includes a collision possibility determining unit 51 configured to determine a possibility of collision between the first vehicle HV and the second vehicle RV within the intersection Int, an approach direction determining unit 52 configured to determine the direction from which the second vehicle RV is approaching, a collision point determining unit 53 configured to determine the collision point (collision position) Pcol1 of the first vehicle HV and the second vehicle RV within the intersection Int, a stop point setting unit 54 configured to set the stop point (stop line or position) Pstp at an entrance to the intersection Int for the first vehicle HV to stop to avoid a collision within the intersection Int, a warning point setting unit 55 configured to set a warning point Pwarn which is a timing position at which a warning Warn that causes the first vehicle HV to stop at the stop point Pstp is appropriately given (issued) as a trigger to prompt the driver to perform a braking operation, the vehicle position identifying unit 56, a lane count determining unit 57, a driving-lane-position identifying unit 58, and a warning control unit 59.

In the present embodiment, the warning unit 20 is formed by the warning control unit 59, a speaker (sound generator) 24, and a display unit 26. The display unit 26 includes a multi-information display and a display for a navigation device.

An operation of the vehicle collision avoidance supporting apparatus 10 of the present embodiment, which is basically configured as described above, will now be described.

(Preconditions for Operation)

Figure 3B:
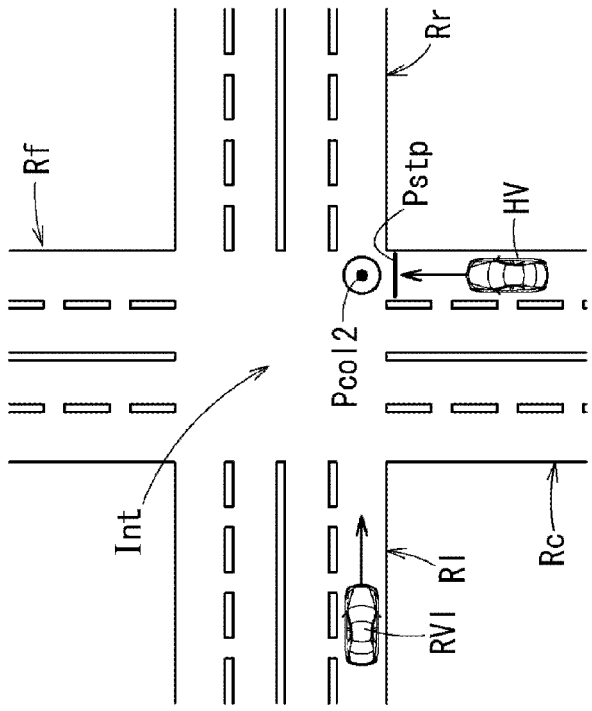
FIG. 3B is a schematic plan view illustrating a positional relationship between the first vehicle and the second vehicle approaching the intersection from a left-side road as viewed from the first vehicle.
Figure 3A:
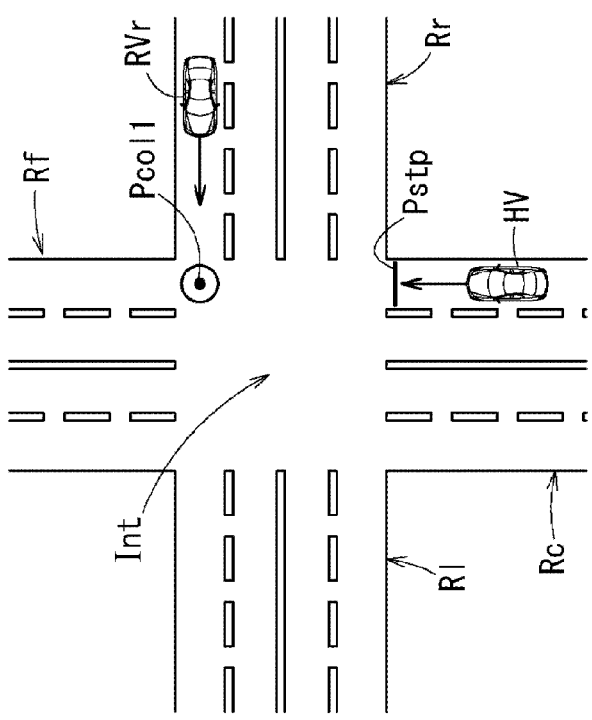
FIG. 3A is a schematic plan view illustrating a positional relationship between the first vehicle and the second vehicle approaching the intersection from a right-side road as viewed from the first vehicle.

It should be noted, as indicated by the collision point Pcol1 and the collision point Pcol2 in FIGS. 3A and 3B, that the collision point Pcol1 for the second vehicle RVr (see FIG. 3A) approaching the intersection Int from the right-side road Rr and the collision point Pcol2 for the second vehicle RVl (see FIG. 3B) approaching the intersection Int from the left-side road Rl are in different positions in the longitudinal direction (i.e., travel direction of the first vehicle HV). Thus, the distance from the stop point Pstp set for the first vehicle HV to each collision point is different from each other depending upon the entering directions of the second vehicles into the intersection (i.e., the left or the right in a view from the first vehicle HV).

Accordingly, in the direction from the collision points Pcol1 and Pcol2 toward the first vehicle HV, if the distance from the collision point Pcol1 to the stop point Pstp and the distance from the collision point Pcol2 to the stop point Pstp are the same, the warning Warn cannot be given appropriately.

Therefore, for the second vehicle RVr approaching the intersection Int from the right-side road Rr and the second vehicle RVl approaching the intersection Int from the left-side road Rl, it is necessary to appropriately set the distance from the collision point Pcol1 to the corresponding stop point Pstp and the distance from the collision point Pcol2 to the corresponding stop point Pstp, in the direction toward the first vehicle HV, to be different from each other. Then by taking the stop point Pstp into account, the warning Warn needs to be given to the first vehicle HV at an appropriate position and timing before the stop point Pstp so that the first vehicle HV can stop before the stop point Pstp.

(Determination of Collision Possibility Based on Determination of Presence of Collision Area)

A possibility of collision between the second vehicle RV and the first vehicle HV is determined. For ease of understanding, it is assumed in the present embodiment that the second vehicle RV is a crossing vehicle approaching the intersection Int at a constant vehicle velocity Vr without making a lane change, and that the first vehicle HV is a vehicle traveling toward the intersection Int also at a constant vehicle velocity Vh without making a lane change.

With reference to the schematic plan view of FIG. 4 and the flowchart of FIG. 5, a process of determining a possibility of collision will be described. The flowchart is executed by the controller 11 of the first vehicle HV.

In step S1, the collision possibility determining unit 51 of the controller 11 acquires the vehicle velocity Vh [m/s] of the first vehicle HV from the vehicle velocity sensor 32, acquires coordinates HV (Xhv, Yhv) defining the position of the first vehicle HV from the GPS receiving device 14, and also acquires the vehicle velocity Vr of the second vehicle RV and coordinates RV (Xrv, Yrv) defining the position of the second vehicle RV through the DSRC communication device 18. In this case, the vehicle position identifying unit 56 of the first vehicle HV identifies the position of the first vehicle HV, and the vehicle position identifying unit 56 of the second vehicle RV identifies the position of the second vehicle RV.

Figure 4:
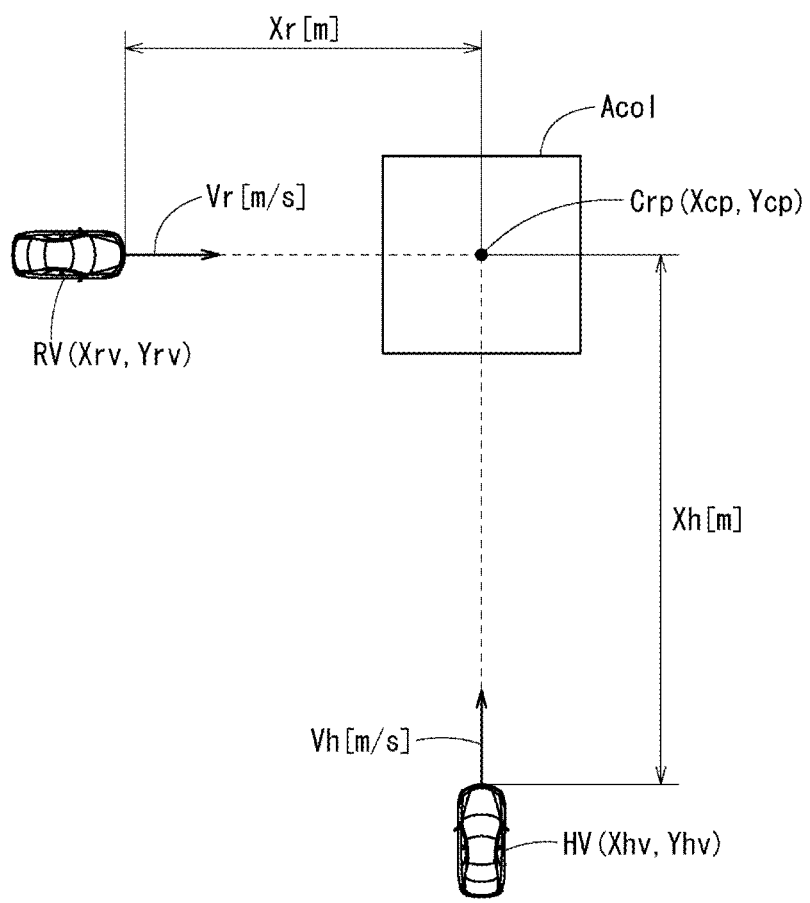
FIG. 4 is a schematic plan view for determining a possibility of collision between the first vehicle and the second vehicle.
Figure 5:
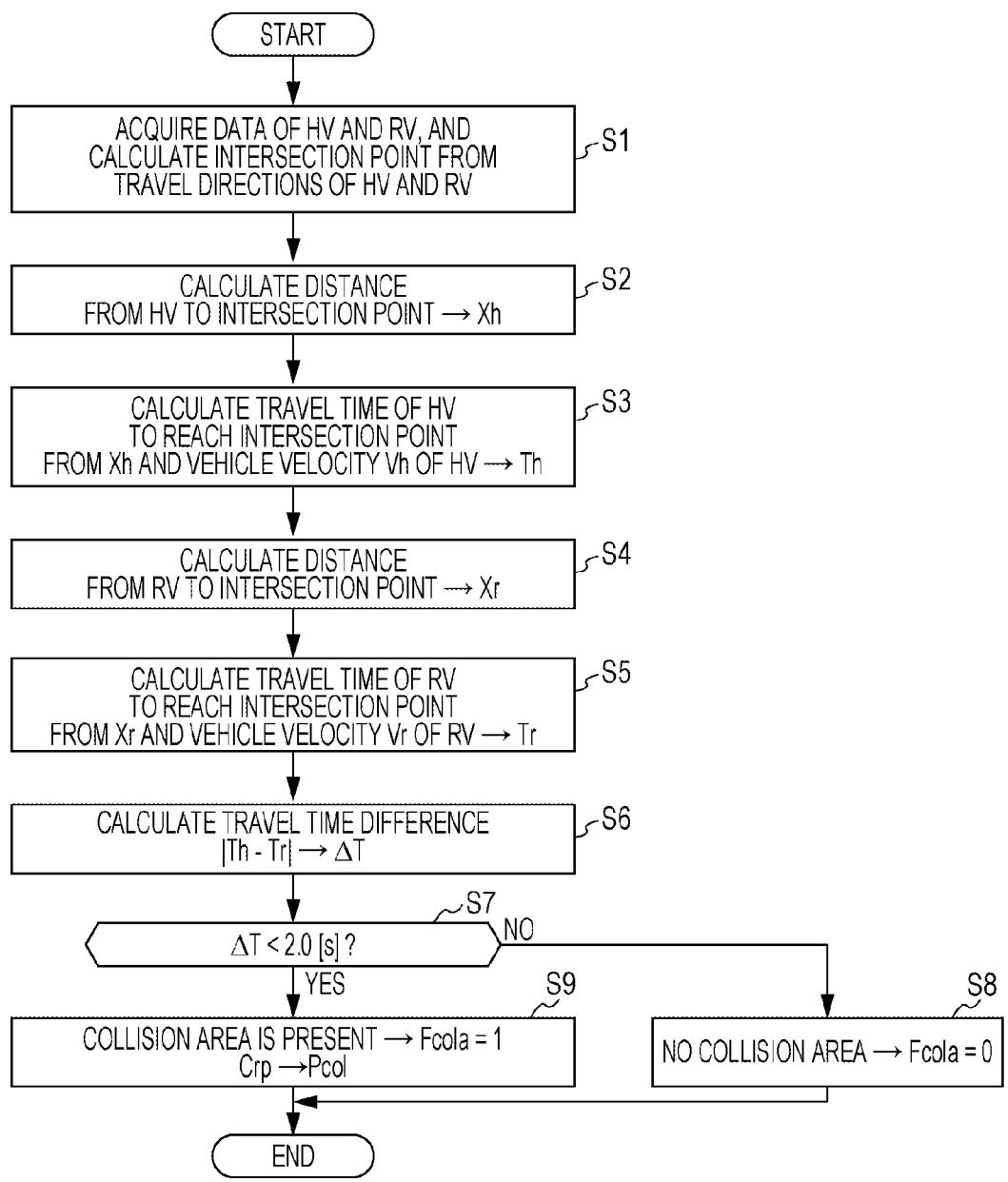
FIG. 5 is a flowchart illustrating a process of determining a possibility of collision between the first vehicle and the second vehicle.

Then in step S1, as illustrated in FIG. 4, coordinates Crp (Xcp, Ycp) of an intersection point Crp of the travel directions of the first vehicle HV and the second vehicle RV are calculated.

In step S2, a distance Xh [m] from the first vehicle HV to the intersection point Crp is calculated as $Xh=|Ycp-Yhv|$.

In step S3, from the distance Xh and the vehicle velocity Vh of the first vehicle HV, the travel time Th [s] of the first vehicle HV to reach the intersection point Crp is calculated as $Th=Xh/Vh$.

In step S4, a distance Xr [m] from the second vehicle RV to the intersection point Crp is calculated as $Xr=|Xcp-Xrv|$.

In step S5, from the distance Xr and the vehicle velocity Vr of the second vehicle RV, the travel time Tr [s] of the second vehicle RV to reach the intersection point Crp is calculated as $Tr=Xr/Vr$.

In step S6, a difference between the travel times of the first vehicle HV and the second vehicle RV to reach the intersection point Crp (i.e., travel time difference $\Delta T$) calculated as $\Delta T=|Th-Tr|$.

In step S7, a determination of whether the first vehicle HV and the second vehicle RV simultaneously exist within a predetermined area (collision area Acol), including the intersection point Crp, is made depending on whether the travel time difference $\Delta T$ is less than a threshold time difference $\Delta Tth$ of, for example, 2.0 [s] ($\Delta T<2.0$ [s]). The collision area Acol is an area that takes into account, for example, the sizes of the first vehicle HV and the second vehicle RV and calculation errors.

If the travel time difference $\Delta T$ is 2.0 [s] or more (NO in step S7, $\Delta T \geq 2.0$ [s]), the collision area Acol is determined not to be present, and a collision area flag Fcola is reset to 0 (Fcola=0) in step S8.

On the other hand, if the travel time difference $\Delta T$ is less than 2.0 [s] (YES in step S7, $\Delta T<2.0$ [s]), the collision area Acol is determined to be present, the collision area flag Fcola is set (Fcola=1), and the collision point determining unit 53 sets (determines) the intersection point Crp as a collision point (possible collision position) Pcol (or changes the intersection point Crp to the collision point Pcol) in step S9.

If the collision area flag Fcola is 1 (Fcola=1), the collision possibility determining unit 51 determines that a collision between the second vehicle RV (crossing vehicle) and the first vehicle HV within the intersection Int is possible.

(Process of Supporting Avoidance of Collision During Driving: Stop Point Determination and Warning Output Determination)

With reference to the schematic plan view of FIG. 6 and the flowchart of FIG. 7, an algorithm for a process of supporting avoidance of a collision during driving will be described.

In step S11, the controller 11 of the first vehicle HV determines whether the collision area flag Fcola is set (Fcola=1).

If the collision area flag Fcola is set (Fcola=1), the process proceeds to step S12, where the approach direction determining unit 52 determines, from a change in the coordinates RV (Xrv, Yrv) of the second vehicle RV, whether the second vehicle RV is approaching from the direction of the right-side road Rr (i.e., from the right) or from the direction of the left-side road Rl (i.e., from the left).

If the approach direction determining unit 52 determines in step S12 that the second vehicle RV is approaching from the left, the process proceeds to step S13, where a warning output determination (subroutine) for the approach from the left is performed. If the approach direction determining unit 52 determines in step S12 that the second vehicle RV is approaching from the right, the process proceeds to step S14, where a warning output determination (subroutine) for the approach from the right is performed.

Figure 6:
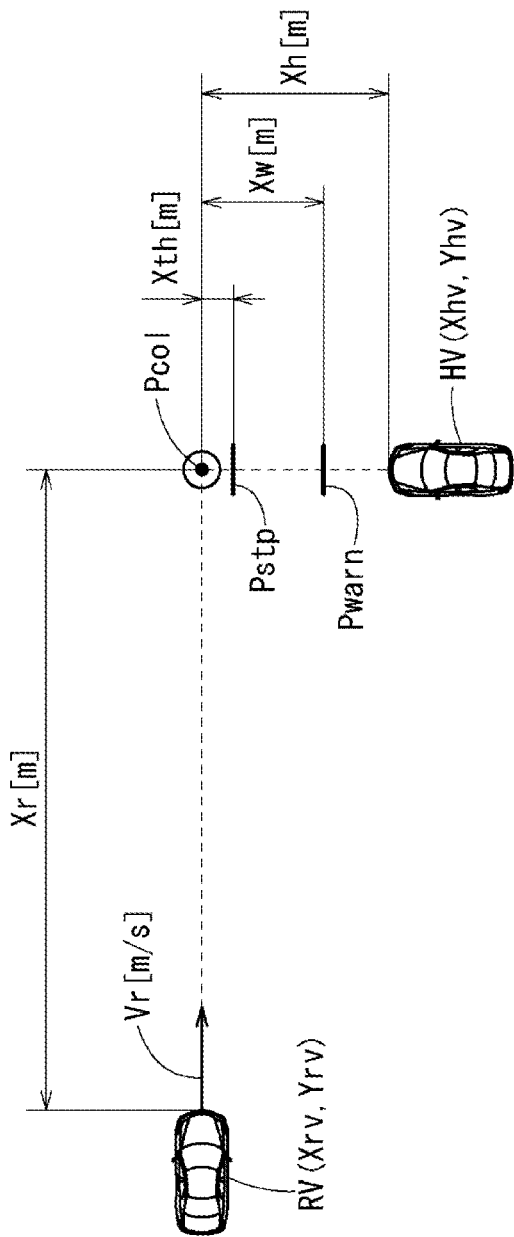
FIG. 6 is a schematic plan view for explaining an algorithm for a process of supporting avoidance of a collision during driving.
Figure 7:
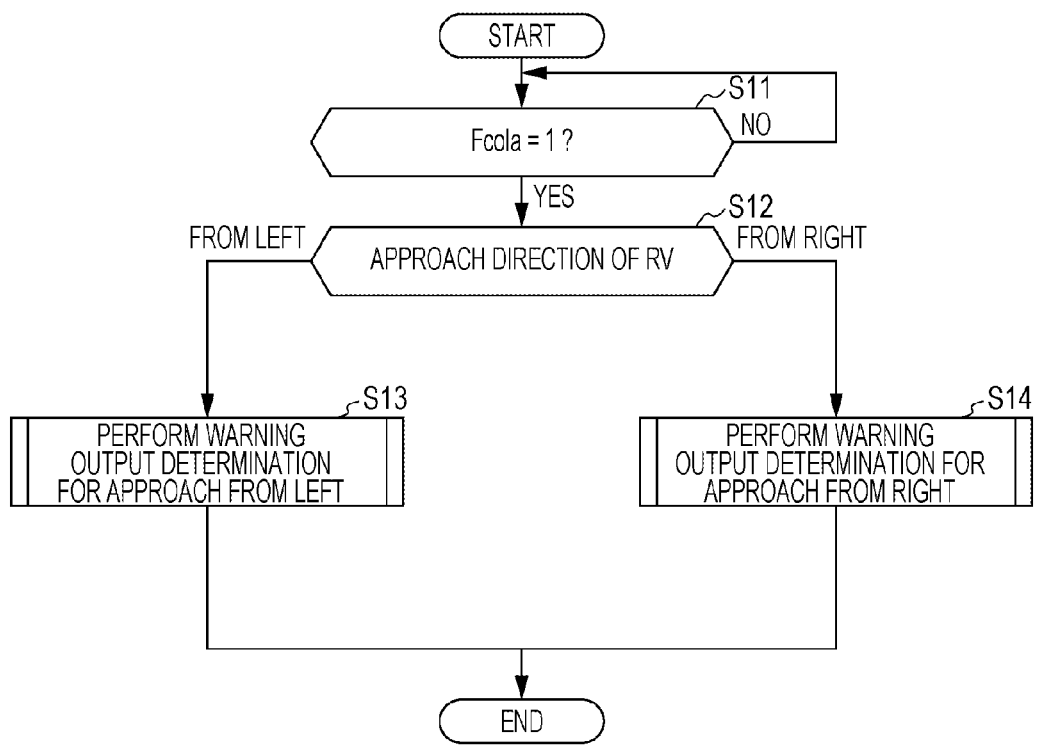
FIG. 7 is a flowchart for explaining an algorithm for a process of supporting avoidance of a collision during driving.

In the warning output determination of steps S13 and S14, as illustrated in FIG. 6, the stop point Pstp for the first vehicle HV is set at a predetermined distance (predetermined range) Xth [m] before the collision point Pcol. Additionally, a distance Xw from the collision point Pcol to the warning point Pwarn, which is for the first vehicle HV to reliably stop before the set stop point Pstp, is determined. As described above, the collision point Pcol corresponds to position coordinates of the intersection point Crp (see FIG. 4) of the azimuth line (heading) in the travel direction of the first vehicle HV and an expected line in the travel direction of the second vehicle RV. It should be noted, as described with reference to FIGS. 3A and 3B, that the predetermined distance (predetermined range) Xth for the second vehicle RVr approaching the intersection Int from the right-side road Rr differs from that for the second vehicle RVl approaching the intersection Int from the left-side road Rl.

(Calculation of Warning Point: Warning Output Determination for Approach from Left-Side Road)

With reference to the schematic plan view of FIG. 8 and the flowchart of FIG. 9, the warning output determination of step S13 in FIG. 7 will be described in detail, which is performed when the second vehicle RV (RVl) is approaching the collision point Pcol within the intersection Int from the left-side road Rl.

In step S13a, on the basis of the collision point Pcol of the first vehicle NV and the second vehicle RV, the stop point setting unit 54 determines and sets the stop point Pstp at the predetermined distance (constant distance) Xth [m], such as a single lane width of about 4 [m] (Xth=4 [m]), before the collision point Pcol.

In step S13b, determinations are made as to whether the vehicle velocity Vr of the second vehicle RV is greater than 30 [km/h] and whether the brake of the second vehicle RV is in the OFF state (not in operation). If either one of the determinations is negative (NO in step S13b, i.e., Vr≤30 [km/h] or the brake of the second vehicle RV is in operation), the warning Warn is determined not to be output (i.e., determined to be unnecessary) in step S13c.

On the other hand, if the vehicle velocity Vr of the second vehicle RV is greater than 30 [km/h] and the brake of the second vehicle RV is in the OFF state (not in operation) (YES in step S13b), it is determined that the first vehicle HV may collide with the second vehicle RV at the collision point Pcol if the first vehicle HV continues to travel at the current vehicle velocity Vhv.

In this case, in step S13d, the warning point setting unit 55 acquires the distance Xh from the position of the first vehicle HV obtained by the vehicle position identifying unit 56 to the collision point Pcol. Then in step S13e, the warning point setting unit 55 sets the warning point Pwarn which takes into account the stop point Pstp, and calculates and acquires the distance Xw from the warning point Pwarn to the collision point Pcol.

The distance Xw is for determining the timing (warning timing) of giving (outputting) the warning Warn from the warning unit 20. The distance Xw is set as a distance which allows the first vehicle HV to stop before the stop point Pstp when the warning Warn is output and the driver of the first vehicle HV applies the brake in response to the warning Warn.

When time (free running time) which takes into account the response time of the driver and the delay time of the vehicle system is about 2 [s], a deceleration G achieved by a brake operation is about 0.6 [G], and the first vehicle HV is in constant acceleration linear motion at a current vehicle velocity of Vh, the distance Xw corresponds to the current vehicle velocity Vh=0 [m/s] is calculated by the following equation (1):

$$Xw[m] = \text{offset distance } D + \text{free running distance} + \text{deceleration distance} \quad (1)$$
$$= 0[m] + Vh \times 2[s] + \{Vh^2 / (2 \times 0.6[G] \times 9.8[m/s^2])\},$$

where the offset distance D will be described later on.

In step S13f, the warning control unit 59 compares, from moment to moment, the distance Xh from the first vehicle HV to the collision point Pcol and the distance Xw from the collision point Pcol to the warning point Pwarn. If the distance Xh is greater than the distance Xw, the warning control unit 59 determines that it is too early to output the warning Warn, and does not output the warning Warn in step S13c.

If the distance Xh is equal to the distance Xw in step S13f, the warning control unit 59 determines that the first vehicle HV has reached the warning point Pwarn. Then in step S13g, the warning control unit 59 outputs the warning Warn from the speaker 24 and/or the display unit 26.

Figure 8:
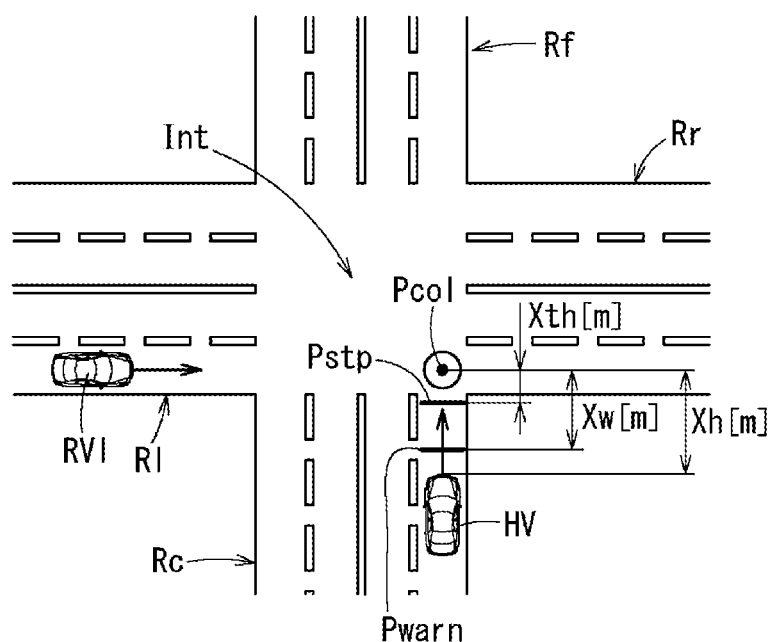
FIG. 8 is a schematic plan view explaining a warning output determination made when the second vehicle is approaching the intersection from the left.
Figure 9:
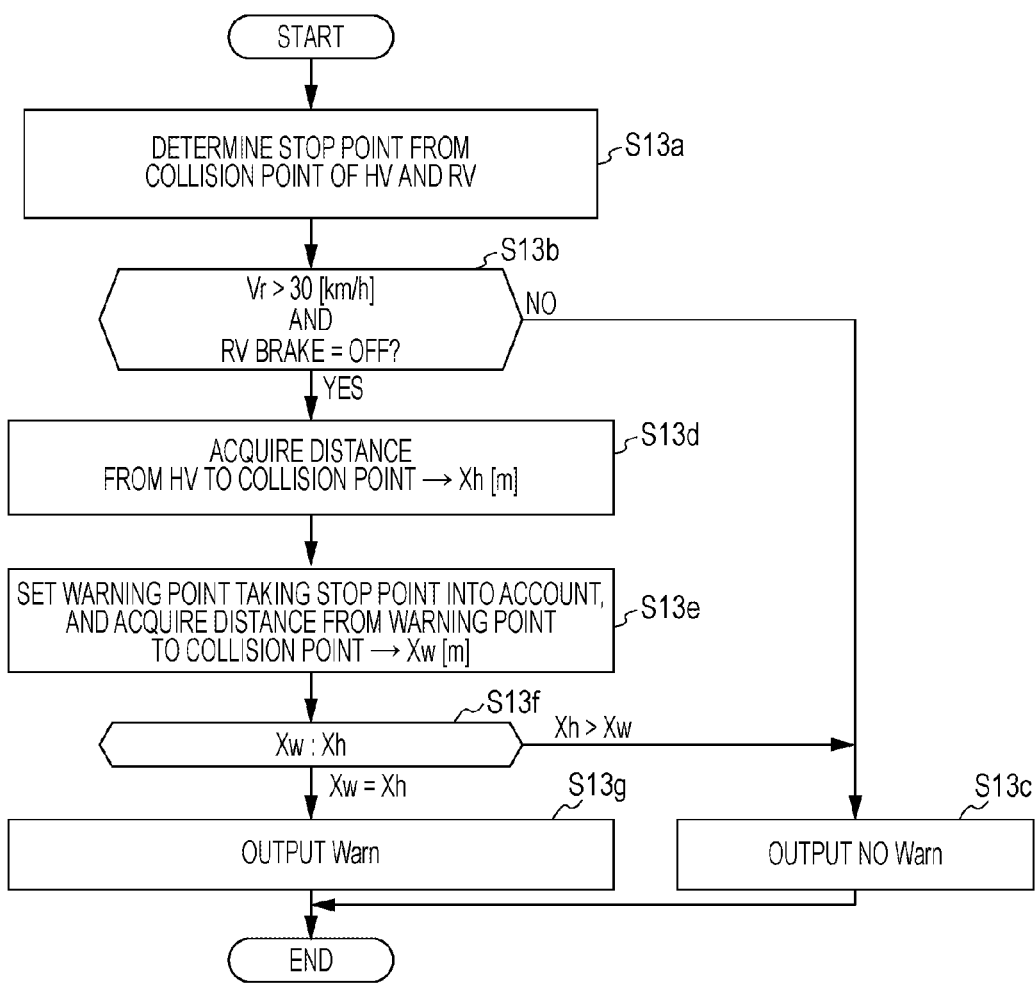
FIG. 9 is a flowchart for explaining a warning output determination made when the second vehicle is approaching the intersection from the left.

As illustrated in FIG. 8, when the second vehicle RV is traveling from the left-side road Rl toward the intersection Int to approach the collision point Pcol while the first vehicle HV is traveling toward the intersection Int, the warning unit 20 outputs the warning Warn (which warns of the approach of a vehicle from the left) at the position and timing of the warning point Pwarn, so that the driver of the first vehicle HV can be alerted that a brake operation needs to be performed. Thus, the first vehicle HV can stop before the stop point Pstp set at the entrance to the intersection Int.

If the first vehicle HV is a vehicle mounted with an automatic braking system, such as a self-driving vehicle, the warning Warn is given at the position and timing of the warning point Pwarn to actuate the automatic brake.

(Calculation of Warning Point: Warning Output Determination for Approach from Right-Side Road)

With reference to the schematic plan view of FIG. 10 and the flowchart of FIG. 11, the warning output determination of step S14 in FIG. 7 will be described in detail, which is performed when the second vehicle RV (RVr) is approaching the collision point Pcol within the intersection Int from the right-side road Rr.

In step S14a, on the basis of the collision point Pcol of the first vehicle HV and the second vehicle RV, the stop point setting unit 54 determines and sets a temporary stop point Pstptp (indicated by a broken line in FIG. 10) at a predetermined distance (constant distance) Xt [m], such as a single lane width of about 4 [m] (Xt=4 [m]), before the collision point Pcol.

In step S14b, the lane count determining unit 57 determines the number of lanes N within the intersection Int. In the example of FIG. 10, the number of lanes N is the number of lanes, in the right-side road Rr, between the driving lane of the second vehicle RV (second right-side approaching lane Lr2) and the entrance for the first vehicle HV to enter the intersection Int. In this case, there are two lanes, the second right-side departing lane Lrf2 and the first right-side departing lane Lrf1 (N=2). Alternatively, the number of lanes from the first right-side departing lane Lrf1, which is the lane closest to the first vehicle HV, to the second vehicle RV may be determined to be the number of lanes N (N=2).

The lane count determining unit 57 can calculate the number of lanes N from an image picked up by the road-side camera Ic1 (see FIG. 1) and acquired through the DSRC communication device 18, or from an image picked up by the front camera 31 of the second vehicle RV. Alternatively, the number of lanes N may be determined to be two on the basis of the position of the second right-side approaching lane Lr2, which is the lane position of the second vehicle RV identified by the road-side camera Ic1 or the front camera 31 of the second vehicle RV, and information indicating the number of lanes in the intersection Int and stored in the map data storage unit 16. The driving lane position of the second vehicle RV is identified by the driving-lane-position identifying unit 58.

In step S14c, an offset distance D [m] by which to shift the temporary stop point Pstptp toward the first vehicle HV is calculated as D=N×lane width. The lane width may be obtained from map information in the map data storage unit 16, or a default value for the lane width, such as 4 [m], may be stored in advance. A default value for the offset distance D may also be stored. This eliminates the need for map information containing lane information.

Figure 10:
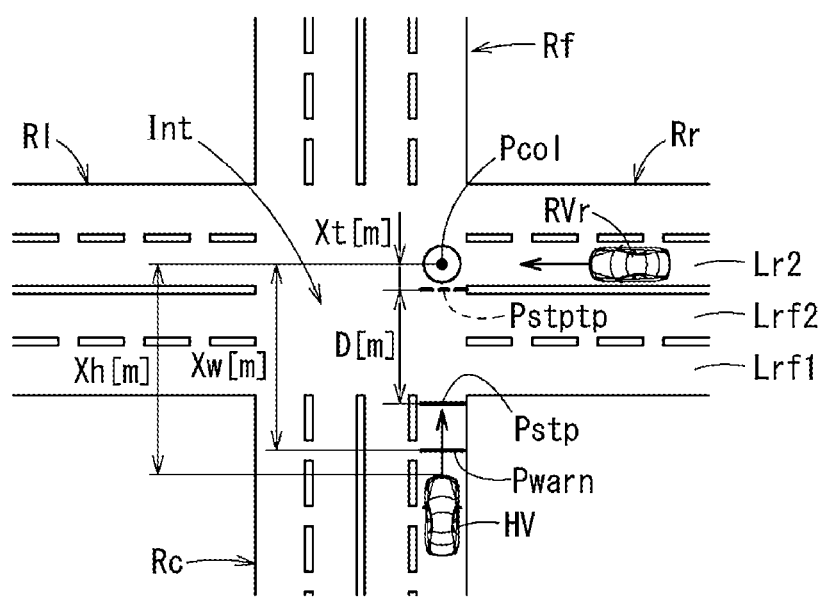
FIG. 10 is a schematic plan view explaining a warning output determination made when the second vehicle is approaching the intersection from the right.
Figure 11:
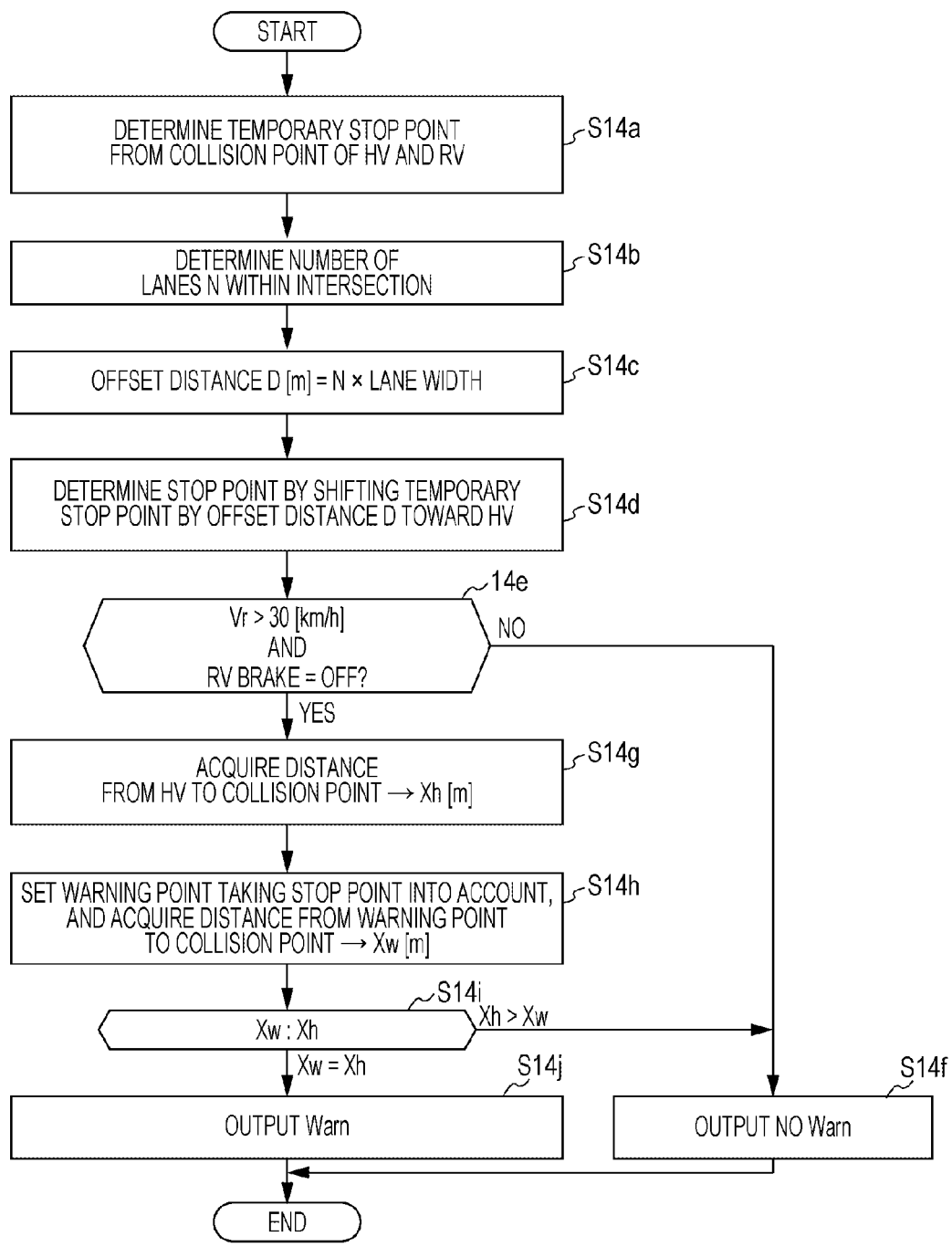
FIG. 11 is a flowchart for explaining a warning output determination made when the second vehicle is approaching the intersection from the right.

In step S14d, the position of the stop point Pstp is determined by shifting the temporary stop point Pstptp by the offset distance D toward the first vehicle HV (see FIG. 10). The stop point Pstp is determined and set near the entrance to the intersection Int.

In step S14e, as in the process for the approach of the second vehicle RV from the left, determinations are made as to whether the vehicle velocity Vr of the second vehicle RV is greater than 30 [km/h] and whether the brake of the second vehicle RV is in the OFF state (not in operation). If either one of the determinations is negative (NO in step S14e, i.e., Vr≤30 [km/h] or the brake of the second vehicle RV is in operation), the warning Warn is determined not to be output (i.e., determined to be unnecessary) in step S14f.

On the other hand, if the vehicle velocity Vr of the second vehicle RV is greater than 30 [km/h] and the brake of the second vehicle RV is in the OFF state (not in operation) (YES in step S14e), it is determined that the first vehicle HV may collide with the second vehicle RV at the collision point Pcol if the first vehicle HV continues to travel at the current vehicle velocity Vhv.

In this case, in step S14g, the warning point setting unit 55 acquires the distance Xh from the position of the first vehicle HV obtained by the vehicle position identifying unit 56 to the collision point Pcol. Then in step S14h, the warning point setting unit 55 sets the warning point Pwarn which takes into account the stop point Pstp, and calculates and acquires the distance Xw from the warning point Pwarn to the collision point Pcol.

The distance Xw is for determining the timing (warning timing) of outputting the warning Warn from the warning unit 20. The distance Xw is set as a distance which allows the first vehicle HV to stop before the stop point Pstp when the warning Warn is output and the driver of the first vehicle HV applies the brake in response to the warning Warn.

When time (free running time) which takes into account the response time of the driver and the delay time of the vehicle system is about 2 [s], a deceleration G achieved by a brake operation is about 0.6 [G], the first vehicle HV is in constant acceleration linear motion at a current vehicle velocity of Vh, and the offset distance D [m] is also taken into account, the distance Xw corresponds to the current vehicle velocity Vh=0 [m/s] is calculated by the following equation (2):

$$Xw[m] = \text{offset distance } D + \text{free running distance} + \text{deceleration distance} \quad (2)$$
$$= D[m] + Vh \times 2[s] + \{Vh^2 / (2 \times 0.6[G] \times 9.8[m/s^2])\}$$

in step S14i, the warning control unit 59 compares, from moment to moment, the distance Xh from the first vehicle HV to the collision point Pcol and the distance Xw from the collision point Pcol to the warning point Pwarn. If the distance Xh is greater than the distance Xw, the warning control unit 59 determines that it is too early to output the warning Warn, and does not output the warning Warn in step S14f.

If the distance Xh is equal to the distance Xw in step S14i, the warning control unit 59 determines that the first vehicle HV has reached the warning point Pwarn, and outputs the warning Warn in step S14j.

As illustrated in FIG. 10, when the second vehicle RV is traveling from the right-side road Rr toward the intersection Int to approach the collision point Pcol while the first vehicle HV is traveling toward the intersection Int, the warning unit 20 outputs the warning Warn (which warns of the approach of a vehicle from the right) at the position and timing of the warning point Pwarn, so that the driver of the first vehicle HV can be alerted that a brake operation needs to be performed. Thus, the first vehicle HV can stop before the stop point Pstp set at the entrance to the intersection Int.

If the first vehicle HV is a vehicle mounted with an automatic braking system, such as a self-driving vehicle, the automatic brake may be actuated at the position and timing of the warning point Pwarn.

(Calculation of Warning Point: Warning Output Determination for Approach from Either Right or Left)

With reference to the schematic plan views of FIGS. 12A and 12B and the flowchart of FIG. 13, a warning output determination process will be described, which is performed without identifying in advance whether the second vehicle RV is approaching the collision point Pcol within the intersection Int from either the right-side road Rr or the left-side road Rl. This process is a combination of the two processes (see FIGS. 9 and 11) described above. Accordingly, the description of the same operations as above will be either omitted or simplified.

Figure 12A:
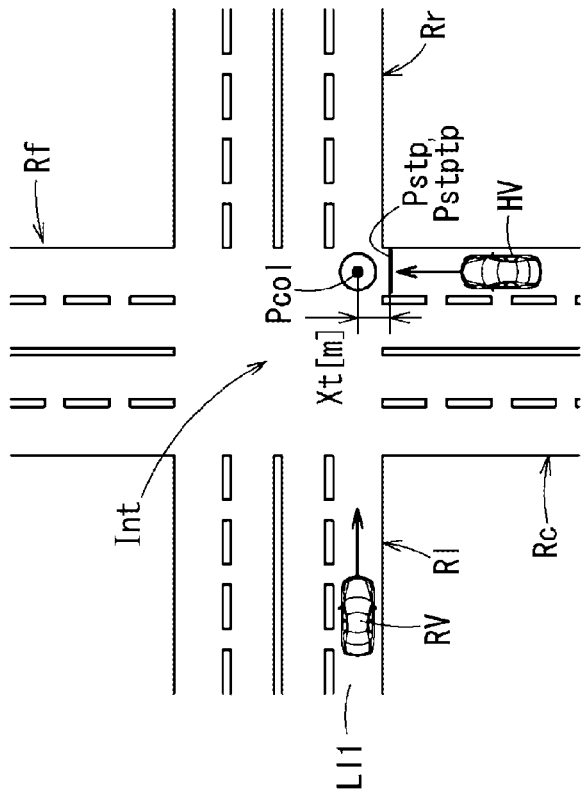
FIG. 12A is a schematic plan view explaining a warning output determination made when it is unknown from which side (right or left) the second vehicle is approaching the intersection.
Figure 12B:
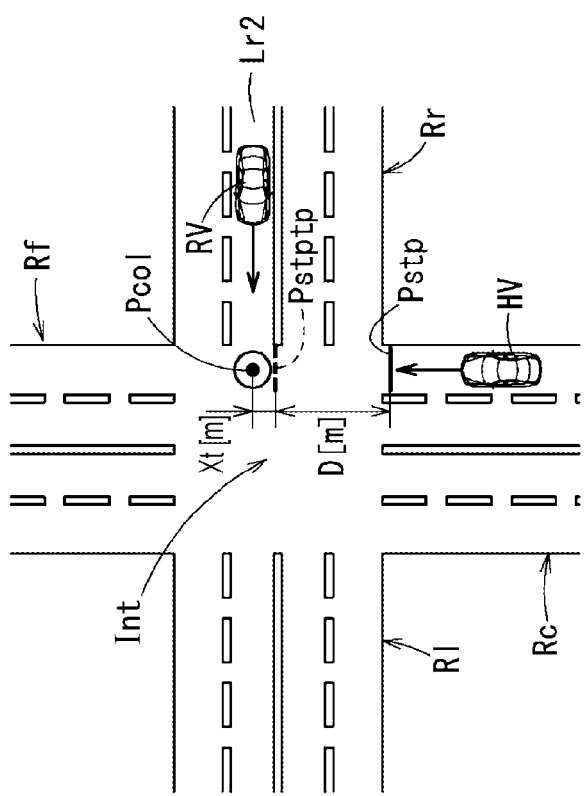
FIG. 12B is another schematic plan view explaining a warning output determination made when it is unknown from which side (right or left) the second vehicle is approaching the intersection.

In step S21 (as in step S14a), on the basis of the collision point Pcol of the first vehicle HV and the second vehicle RV, the stop point setting unit 54 determines and sets the temporary stop point Pstptp at the predetermined distance (constant distance) Xt [m], such as a single lane width of about 4 [m] (Xt=4 [m]), before the collision point Pcol (see FIGS. 12A and 12B).

In step S22, the driving-lane-position identifying unit 58 determines the lane in which the second vehicle RV is traveling. In this case, the driving-lane-position identifying unit 58 in the controller 11 of the first vehicle HV may identify the lane in which the second vehicle RV is traveling either by acquiring an image picked up by the front camera 31 of the second vehicle RV through vehicle-to-vehicle communication, or by acquiring an image picked up by the road-side camera Ic1 or Ic2.

In step S23, on the basis of the driving lane of the second vehicle RV determined in step S22 (i.e., the second right-side approaching lane Lr2 in FIG. 12A or the first left-side approaching lane Ll1 in FIG. 12B), the offset distance D is calculated as D=N×lane width (where N is the number of lanes determined by the lane count determining unit 57).

In the example of FIG. 12A, the offset distance D is determined by D=2×lane width, whereas in the example of FIG. 12B, the offset distance D is determined to be 0 (D=0).

In step S24, the stop point setting unit 54 determines and sets the stop point Pstp by shifting the temporary stop point Pstptp by the offset distance D toward the first vehicle HV. In either of FIGS. 12A and 12B, the resulting stop point Pstp is determined to be a point near the entrance to the intersection Int.

Figure 13:
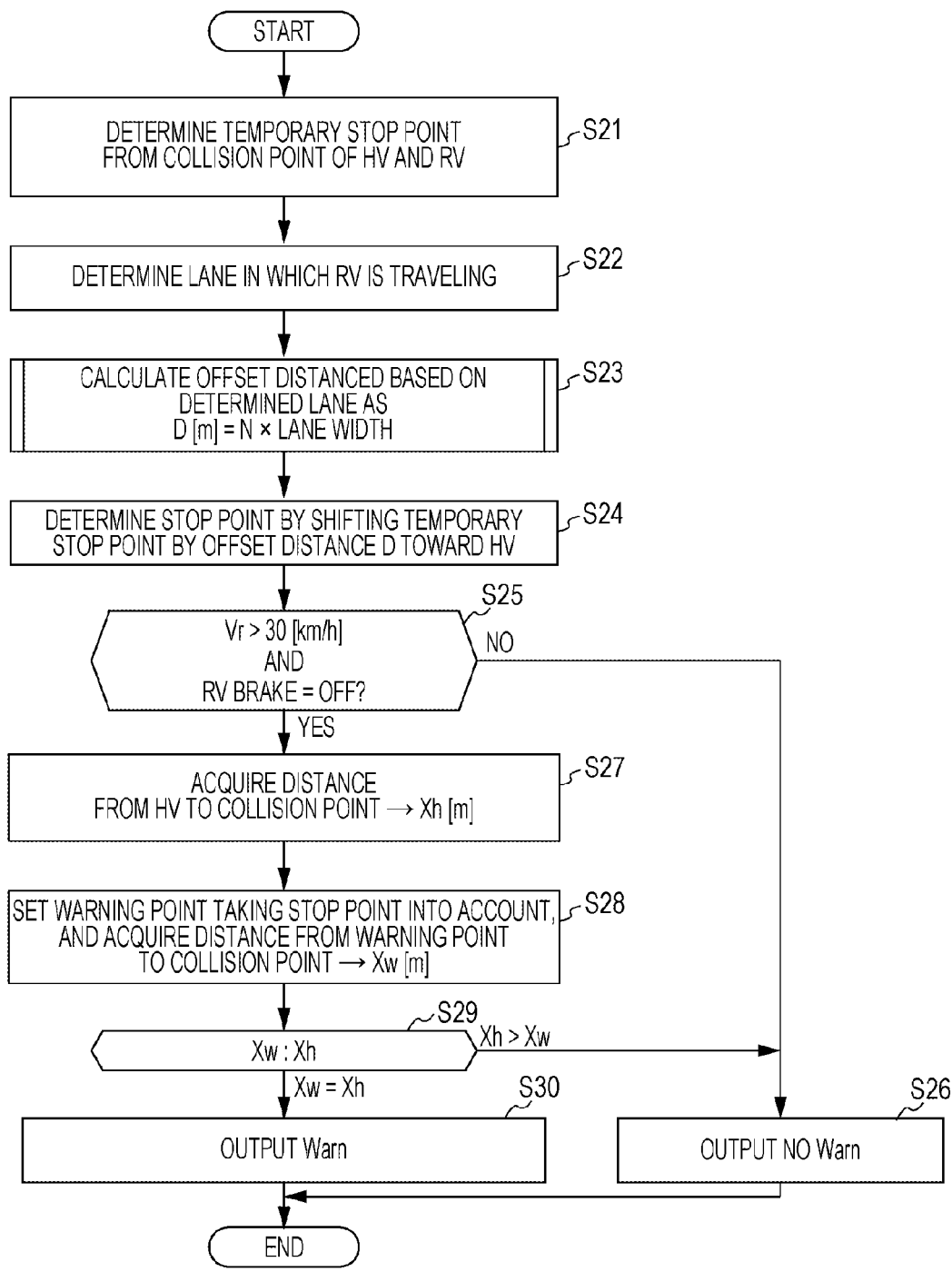
FIG. 13 is a flowchart for explaining a warning output determination made when it is unknown from which side (right or left) the second vehicle is approaching the intersection.

Steps S25 to S30 of the warning output determination process in FIG. 13 are executed in the same manner as above.

(Summary of Present Embodiment, and Other Embodiments)

The vehicle collision avoidance supporting apparatus 10 according to the present embodiment includes the vehicle-mounted sensor 12 serving as a first-vehicle-information acquiring unit configured to acquire a driving state of the first vehicle HV; the DSRC communication device 18 serving as a second-vehicle-information acquiring unit configured to acquire a driving state of the second vehicle RV moving in a direction X crossing a travel direction Y (see FIG. 1) of the first vehicle HV; the collision possibility determining unit 51 configured to determine, from the driving states of the first vehicle HV and the second vehicle RV, a possibility of collision between the first vehicle HV and the second vehicle RV at the collision point Pcol within the intersection Int; the approach direction determining unit 52 configured to determine from which side (right or left), as viewed in the travel direction Y of the first vehicle HV, the second vehicle RV is approaching the first vehicle HV; the collision point determining unit 53 configured to determine the collision point Pcol depending on the determined side (right or left) from which the second vehicle RV is approaching; the stop point setting unit 54 configured to set, on the basis of the determined collision point Pcol, the stop point Pstp serving as a stop target for the first vehicle HV; and the warning unit 20 configured to give the warning Warn to the driver.

If the collision possibility determining unit 51 determines that a collision between the first vehicle HV and the second vehicle RV is possible, the warning unit 20 gives the warning Warn to the driver at timing which allows the first vehicle HV to stop before the stop point Pstp. For this, the warning point setting unit 55 sets the warning point Pwarn, at a position within a predetermined range before the stop point Pstp as viewed from the first vehicle HV, to allow the first vehicle HV to stop before the stop point Pstp.

If the collision possibility determining unit 51 determines that a collision between the first vehicle HV and the second vehicle RV is possible, the warning unit 20 gives the warning Warn upon passage of the first vehicle HV beyond the warning point Pwarn.

As described above, after the determination of from which side (right or left) the second vehicle RV is approaching, the position of the collision point Pcol is determined, the position of the stop point Pstp is set on the basis of the determined position of the collision point Pcol, and the warning Warn is given upon arrival of the first vehicle HV at the warning point Pwarn which is set to allow the first vehicle HV to stop before the set stop point Pstp. Accordingly, even when the second vehicle RV is approaching from either the right or left side, the warning Warn can be given to prevent the first vehicle HV from entering the intersection Int, whereby it is possible to provide support for the first vehicle HV to reliably stop before the stop point Pstp.

In this case, the stop point setting unit 54 temporarily sets, in advance, the stop point Pstp at a predetermined distance from the collision point Pcol toward the first vehicle HV. Then, on the basis of from which side (right or left) the second vehicle RV is approaching the first vehicle HV as viewed in the travel direction of the first vehicle HV, the stop point setting unit 54 adjusts the position of the stop point Pstp set in advance.

The position of the stop point Pstp set in advance for the collision point Pcol is defined as the temporary stop point Pstptp serving as a reference position. The stop point setting unit 54 adjusts the temporary stop point Pstptp serving as a reference position on the basis of from which side (right or left) the second vehicle RV is approaching. The position of the stop point Pstp can thus be appropriately set with a simple configuration.

The stop point setting unit 54 preferably adjusts the position of the stop point Pstp using the offset distance D based on the number of lanes N within the intersection Int determined by the lane count determining unit 57. For example, the offset distance D is 0 [m] for the second vehicle RVl approaching from the left-side road Rl, and N×lane width [m] for the second vehicle RVr approaching from the right-side road Rr. Since the stop point Pstp is determined in accordance with the number of lanes N, the stop point Pstp can be set at an appropriate position. As a result, the warning Warn can be given at appropriate timing which does not allow the first vehicle HV to enter the intersection Int. This can provide support for the first vehicle HV to reliably stop before the stop point Pstp.

As described above, the driving-lane-position identifying unit 58 is provided, which is configured to identify a lane position at which the second vehicle RV is traveling. In accordance with the lane position identified by the driving-lane-position identifying unit 58, the distance (offset distance D) based on the number of lanes N is determined. Accordingly, the stop point Pstp can be set at a correct and appropriate position, and the warning Warn can be reliably given at an appropriate position and timing which does not allow the first vehicle HV to enter the intersection Int. This can provide support for the first vehicle HV to reliably stop before the stop point Pstp.

In this case, by using an image picked up by the front camera 31 of the second vehicle RV, the driving-lane-position identifying unit 58 can easily identify the driving lane position of the second vehicle RV.

The vehicle collision avoidance supporting apparatus 10 according to another embodiment includes the vehicle-mounted sensor 12 serving as a first-vehicle-information acquiring unit configured to acquire a driving state of the first vehicle HV; the DSRC communication device 18 serving as a second-vehicle-information acquiring unit configured to acquire a driving state of the second vehicle RV moving in the direction X crossing the travel direction Y of the first vehicle HV; the collision possibility determining unit 51 configured to determine, from the driving states of the first vehicle HV and the second vehicle RV, a possibility of collision between the first vehicle HV and the second vehicle RV at the collision point Pcol within the intersection Int; the warning unit 20 configured to give the warning Warn to the driver if the collision between the first vehicle HV and the second vehicle RV is determined to be possible; the driving-lane-position identifying unit 58 configured to identify a lane position at which the second vehicle RV is traveling; the stop point setting unit 54 configured to set the stop point Pstp serving as a stop target for the first vehicle HV in accordance with the lane position at which the second vehicle RV is traveling; and the warning point setting unit 55 configured to set the warning point Pwarn, at a position before the stop point Pstp, to allow the first vehicle HV to stop before the stop point Pstp.

If the collision possibility determining unit 51 determines that a collision between the first vehicle HV and the second vehicle RV is possible, the warning unit 20 gives the warning Warn to the driver upon passage of the first vehicle HV beyond the warning point Pwarn.

As described above, after the determination of the lane in which the second vehicle RV is traveling, the position of the stop point Pstp is set and the warning Warn is given at the position and timing of passage of the first vehicle HV beyond the warning point Pwarn, which is set to allow the first vehicle HV to stop before the stop point Pstp. Accordingly, regardless of the lane in which the second vehicle RV is traveling, the warning Warn can be given at the position and timing which does not allow the first vehicle HV to enter the intersection Int. This can provide support for the first vehicle HV to reliably stop before the stop point Pstp at the entrance to the intersection Int.

A vehicle collision avoidance supporting method according to the present embodiment is a collision avoidance supporting method for the first vehicle HV which includes the vehicle-mounted sensor 12 serving as a first-vehicle-information acquiring unit configured to acquire a driving state of the first vehicle HV, and the DSRC communication device 18 serving as a second-vehicle-information acquiring unit configured to acquire a driving state of the second vehicle RV moving in the direction X crossing the travel direction Y of the first vehicle HV. The collision avoidance supporting method includes a collision possibility determining step (step S1) of determining, from the driving states of the first vehicle HV and the second vehicle RV, a possibility of collision between the first vehicle HV and the second vehicle RV at the collision point Pcol within the intersection Int; an approach direction determining step (step S1) of determining from which side (right or left), as viewed in the travel direction Y of the first vehicle HV, the second vehicle RV is approaching the first vehicle HV; a collision point determining step (from steps S2 to S6 to YES in step S7, and then to step S9) of determining the collision point Pcol depending on the determined side, right or left, from which the second vehicle RV is approaching; a stop point setting step (step S13a, step S14d) of setting the stop point Pstp serving as a stop target for the first vehicle HV on the basis of the determined collision point Pcol; and a warning step (step S14j) of giving the warning Warn to the driver upon passage of the first vehicle HV beyond the warning point Pwarn if the collision possibility determining step determines that the collision between the first vehicle HV and the second vehicle RV is possible.

In the vehicle collision avoidance supporting method of the embodiment described above, after the determination of from which side (right or left) the second vehicle RV is approaching, the position of the collision point Pcol is determined, the position of the stop point Pstp is set on the basis of the determined position of the collision point Pcol, and the warning Warn is given at the position and timing of the warning point Pwarn set to allow the first vehicle HV to stop before the set stop point Pstp. Accordingly, even when the second vehicle RV is approaching from either the right or left side, it is possible to alert the driver at an appropriate position and timing which prevents entry into the intersection Int, and thus to provide support for the first vehicle HV to reliably stop before the stop point Pstp.

The present disclosure is not limited to the embodiments described above, and can be configured variously in accordance with the description of the present specification.

What is claimed is:

1. A vehicle collision avoidance supporting apparatus comprising:
a first-vehicle-information acquiring device configured to acquire a driving state of a first vehicle which is a subject vehicle, the driving state of the first vehicle comprising a travel direction of the first vehicle;
a second-vehicle-information acquiring device configured to acquire a driving state of a second vehicle moving in a direction of left-to-right or right-to-left in a view of the travel direction of the first vehicle, the driving state of the second vehicle comprising a travel direction of the second vehicle;
a collision possibility determiner configured to determine, on a basis of the driving states of the first vehicle and the second vehicle, a possibility of collision between the first vehicle and the second vehicle at a collision point within an intersection when the first and second vehicles are approaching the intersection;
a warning device provided in the first vehicle and configured to give a warning to a driver of the first vehicle when the collision between the first vehicle and the second vehicle is determined to be possible;
an approach direction determiner configured to determine, on a basis of the driving state of the second vehicle, the approaching direction of the second vehicle, which is either of the left-to-right direction or the right-to-left direction, from which the second vehicle is approaching the intersection;
a collision point determiner configured to determine the collision point depending on the determined approaching direction of the second vehicle; and
a stop point setter configured to set, on a basis of the determined collision point and a predetermined distance from the determined collision point, a stop target point for the first vehicle, the predetermined distance being set to be a different distance depending on the approaching direction of the second vehicle,
wherein the warning device gives the warning to the driver when the first vehicle enters a predetermined range defined by the stop target point.

2. The vehicle collision avoidance supporting apparatus according to claim 1, further comprising a warning point setter configured to set a warning point to allow the first vehicle to stop within the predetermined range, but before the stop target point, wherein the warning device gives the warning upon passage of the first vehicle beyond the warning point.

3. The vehicle collision avoidance supporting apparatus according to claim 1, wherein the stop point setter sets in advance the stop target point at a predetermined distance from the collision point toward the first vehicle, and adjusts a position of the target stop point in the traveling direction of the first vehicle on a basis of the approaching direction of the second vehicle.

4. The vehicle collision avoidance supporting apparatus according to claim 1, wherein the vehicle collision avoidance supporting apparatus is further configured to detect a number of lanes within the intersection, and the stop point setter adjusts the position of the stop target point in accordance with a distance determined from the number of lanes within the intersection.

5. The vehicle collision avoidance supporting apparatus according to claim 1, wherein the second-vehicle-information acquiring device comprises a vehicle-to-vehicle communication device that acquires the driving state of the second vehicle.

6. The vehicle collision avoidance supporting apparatus according to claim 4, further comprising a driving-lane-position identifier configured to identify a lane position at which the second vehicle is traveling, wherein the stop point setter determines the distance based on the number of lanes and the lane position identified by the driving-lane-position identifier.

7. The vehicle collision avoidance supporting apparatus according to claim 6, further comprising an image pickup device installed in the second vehicle and configured to capture an image of a front view from the second vehicle, wherein the driving-lane-position identifier acquires the image captured by the image pickup device of the second vehicle, and identifies, from the captured image, the lane position at which the second vehicle is traveling.

8. A vehicle collision avoidance supporting apparatus comprising:

a first-vehicle-information acquiring device configured to acquire a driving state of a first vehicle which is a subject vehicle, the driving state of the first vehicle comprising a travel direction of the first vehicle;

a second-vehicle-information acquiring device configured to acquire a driving state of a second vehicle moving in a direction crossing the travel direction of the first vehicle, the driving state of the second vehicle comprising a travel direction of the second vehicle;

a collision possibility determiner configured to determine, on a basis of the driving states of the first vehicle and the second vehicle, a possibility of collision between the first vehicle and the second vehicle at a collision point within an intersection when the first and second vehicles are approaching the intersection;

a warning device provided in the first vehicle and configured to give a warning to a driver of the first vehicle when the collision between the first vehicle and the second vehicle is determined to be possible;

a driving-lane-position identifier configured to identify a lane position at which the second vehicle is traveling:

a stop point setter configured to set, depending on the identified lane position of the second vehicle and a predetermined distance from the identified lane position, a stop target point for the first vehicle to stop, the predetermined distance being set to be a different distance depending on the identified lane position; and a warning point setter configured to set a warning point to allow the first vehicle to stop before the stop target point, wherein when the collision possibility determiner determines that the collision between the first vehicle and the second vehicle is possible, the warning device gives the warning to the driver upon passage of the first vehicle beyond the warning point.

9. A vehicle collision avoidance supporting method comprising steps of:

detecting a first vehicle, thereby acquiring a first-vehicle-information of the first vehicle which is a subject vehicle, including a driving state of the first vehicle which comprises a travel direction of the first vehicle;

detecting a second vehicle, thereby acquiring a second-vehicle-information including a driving state of the second vehicle moving in a direction of left-to-right or right-to-left in a view of the travel direction of the first vehicle, the driving state of the second vehicle comprising a travel direction of the second vehicle;

determining, based on the driving states of the first vehicle and the second vehicle, a possibility of collision between the first vehicle and the second vehicle at a collision point within an intersection when the first and second vehicles are approaching the intersection;

determining the approaching direction of the second vehicle which is either of the left-to-right direction or the right-to-left direction, from which the second vehicle is approaching the intersection;

determining the collision point depending on the determined approaching direction of the second vehicle;

setting, on a basis of the determined collision point and a predetermined distance from the collision point, a stop target point for the first vehicle to stop, the predetermined distance being set to be a different distance depending on the approaching direction of the second vehicle;

setting a warning point to allow the first vehicle to stop before the stop target point; and controlling a warning device installed in the first vehicle to give a warning to a driver of the first vehicle when it is determined that the collision between the first vehicle and the second vehicle is possible and that the first vehicle passes beyond the warning point.

* * * * *